United States Patent
Tanaka (10) Patent No.: US 10,352,701 B2
(45) Date of Patent: Jul. 16, 2019

(54) PHYSICAL QUANTITY SENSOR, SENSOR DEVICE, ELECTRONIC APPARATUS, AND MOVING OBJECT

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 174 days.

(21) Appl. No.: 15/260,757

(22) Filed: Sep. 9, 2016

(65) Prior Publication Data

US 2017/0074658 A1 Mar. 16, 2017

(30) Foreign Application Priority Data

Sep. 15, 2015 (JP) .................................. 2015-181651

(51) Int. Cl.
*G01P 15/125* (2006.01)
*G01C 19/5755* (2012.01)
*G01C 19/5769* (2012.01)
*G01P 15/08* (2006.01)

(52) U.S. Cl.
CPC ..... *G01C 19/5755* (2013.01); *G01C 19/5769* (2013.01); *G01P 15/125* (2013.01); *G01P 2015/0831* (2013.01); *G01P 2015/0837* (2013.01); *G01P 2015/0874* (2013.01)

(58) Field of Classification Search
CPC ........... G01P 15/125; G01P 2015/0837; G01P 2015/0831
See application file for complete search history.

(56) References Cited

U.S. PATENT DOCUMENTS 4,736,629 A * 4/1988 Cole .................. G01P 15/0802
324/661
5,488,864 A * 2/1996 Stephan ................ G01P 15/125
73/514.32

(Continued)

FOREIGN PATENT DOCUMENTS

DE 102008040872 A1 2/2010
JP 2013-040856 A 2/2013

(Continued)

OTHER PUBLICATIONS

Extended European Search Report for Patent Application No. EP 16188503.3 dated Jan. 12, 2017 (7 pages).

*Primary Examiner* — Son T Le
*Assistant Examiner* — Herbert K Roberts
(74) *Attorney, Agent, or Firm* — Harness, Dickey & Pierce, P.L.C.

(57) ABSTRACT

A physical quantity sensor includes a base substrate, a movable portion that is oscillatably provided around an axis while facing the base substrate and that is divided into a first movable portion and a second movable portion, a first fixed electrode that is disposed on the base substrate facing the first movable portion, and a second fixed electrode that is disposed on the base substrate facing the second movable portion. The first fixed electrode and the second fixed electrode are configured so as to offset at least a part of a difference between a first fringe capacitance, which is between the first movable portion and the first fixed electrode, and a second fringe capacitance, which is between the second movable portion and the second fixed electrode.

14 Claims, 10 Drawing Sheets

(56) References Cited

U.S. PATENT DOCUMENTS

| | | | | |
|---|---|---|---|---|
| 5,900,550 | A * | 5/1999 | Menzel | G01P 15/125 |
| | | | | 73/514.29 |
| 6,935,175 | B2 | 8/2005 | Eskridge et al. | |
| 9,073,744 | B2 | 7/2015 | Tanaka | |
| 9,151,775 | B2 | 10/2015 | Yoda | |
| 10,126,322 | B2 * | 11/2018 | Yoshida | G01P 15/0802 |
| 2004/0160232 | A1 * | 8/2004 | Yue | G01P 15/125 |
| | | | | 324/660 |
| 2007/0000323 | A1 * | 1/2007 | Kuisma | G01P 15/0802 |
| | | | | 73/514.32 |
| 2008/0173091 | A1 * | 7/2008 | McNeil | G01P 15/125 |
| | | | | 73/514.32 |
| 2011/0296917 | A1 * | 12/2011 | Reinmuth | B81C 99/0045 |
| | | | | 73/514.32 |
| 2013/0042684 | A1 * | 2/2013 | Yoda | G01P 15/125 |
| | | | | 73/514.01 |
| 2017/0292970 | A1 * | 10/2017 | Isobe | G01P 15/125 |
| 2018/0372774 | A1 * | 12/2018 | Isobe | G01P 15/08 |

FOREIGN PATENT DOCUMENTS

| | | |
|---|---|---|
| JP | 2013-217772 A | 10/2013 |
| JP | 2014-149234 A | 8/2014 |

* cited by examiner

PHYSICAL QUANTITY SENSOR, SENSOR DEVICE, ELECTRONIC APPARATUS, AND MOVING OBJECT

BACKGROUND

1. Technical Field

The present invention relates to a physical quantity sensor, a sensor device, an electronic apparatus, and a moving object.

2. Related Art

As a physical quantity sensor that detects a physical quantity such as acceleration or an angular velocity, a so-called seesaw type sensor is known (for example, refer to JP-A-2013-040856). For example, the physical quantity sensor disclosed in JP-A-2013-040856 includes a base substrate, a sensor portion which is oscillatably supported by the base substrate and on which a movable electrode portion is provided via the center of oscillation axis on each of one side and the other side, and a fixed electrode portion that is provided on the base substrate so as to face each movable electrode portion. In such a physical quantity sensor, it is possible to detect a physical quantity such as acceleration or an angular velocity based on an electrostatic capacitance between the movable electrode portion and the fixed electrode portion.

In addition, in the physical quantity sensor disclosed in JP-A-2013-040856, a sensor unit is disposed on the upper portion of a first concave portion provided in the base substrate. In addition, on a surface in a sensor unit side of the base substrate, a second concave portion of which a depth is deeper than the first concave portion is provided at a superimposed position in a plan view seen from a tip of the sensor unit. In this way, it is possible to reduce gas damping between the sensor unit and the base substrate.

In the above-described physical quantity sensor disclosed in JP-A-2013-040856, a fringe capacitance generated between the movable electrode and the fixed electrode portion in one side and a fringe capacitance generated between the movable electrode and the fixed electrode portion in the other side are different from each other. In the related art, in a state in which a physical quantity is not applied to the sensor unit, an amount of electrostatic capacitance offset which is a difference between the electrostatic capacitance between the movable electrode and the fixed electrode portion in one side and the electrostatic capacitance between the movable electrode and the fixed electrode portion in the other side increases due to the difference between the two fringe capacitances. As a result, there has been a problem in that the detection accuracy deteriorates.

SUMMARY

An advantage of some aspects of the invention is to provide a physical quantity sensor that can improve detection accuracy and to provide a sensor device, an electronic apparatus, and a moving object that include the physical quantity sensor.

The invention can be realized in the following aspects.

According to an aspect of the invention, there is provided a physical quantity sensor that includes: a substrate; a movable object that is oscillatably provided around a center of oscillation axis while facing the substrate and that is divided into a first movable portion and a second movable portion of which an area is larger than that of the first movable portion with the center of oscillation axis as a boundary in a plan view seen from a thickness direction of the substrate; a first electrode that is disposed on the substrate facing the first movable portion; and a second electrode that is disposed on the substrate facing the second movable portion. The first electrode and the second electrode are configured so as to offset at least a part of a difference between a first fringe capacitance, which is between the first movable portion and the first electrode, and a second fringe capacitance, which is between the second movable portion and the second electrode.

According to the physical quantity sensor described above, by offsetting at least a part of the difference between the first fringe capacitance, which is between the first movable portion and the first electrode, and the second fringe capacitance, which is between the second movable portion and the second electrode, an electrostatic capacitance offset that is the difference between the electrostatic capacitance, which is between the first movable portion and the first electrode, and the electrostatic capacitance, which is between the second movable portion and the second electrode in a state in which the physical quantity is not applied to the movable object can be reduced. As a result, it is possible to improve the detection accuracy.

According to another aspect of the invention, there is provided a physical quantity sensor that includes: a substrate; a movable object that is oscillatably provided around a center of oscillation axis while facing the substrate and that is divided into a first movable portion and a second movable portion of which an area is larger than that of the first movable portion with the center of oscillation axis as a boundary in a plan view seen from a thickness direction of the substrate; a first electrode that is disposed on the substrate facing the first movable portion; and a second electrode that is disposed on the substrate facing the second movable portion. An area of a first region in which the first movable portion and the first electrode are superimposed on each other is larger than an area of a second region in which the second movable portion and the second electrode are superimposed on each other in a plan view.

According to the physical quantity sensor described above, by offsetting at least a part of the difference between the first fringe capacitance, which is between the first movable portion and the first electrode, and the second fringe capacitance, which is between the second movable portion and the second electrode, an electrostatic capacitance offset that is the difference between the electrostatic capacitance, which is between the first movable portion and the first electrode, and the electrostatic capacitance, which is between the second movable portion and the second electrode in a state in which the physical quantity is not applied to the movable object can be reduced. As a result, it is possible to improve the detection accuracy.

In the physical quantity sensor according to the aspect of the invention, a length of the second region in the direction where the first movable portion and the second movable portion are arranged may be shorter than a length of the first region.

In this way, even when the lengths of the first movable portion and the second movable portion in the direction along the center of oscillation axis are mutually the same, it is possible to offset at least a part of the difference between the first fringe capacitance and the second fringe capacitance by making the area of the first region be larger than the area of the second region.

In the physical quantity sensor according to the aspect of the invention, an end of the first electrode at the opposite side of the center of oscillation axis in a plan view may be positioned at an outer side of the first region.

In this way, it is possible to prevent the first movable portion from sticking to the substrate, or reduce a degree of such sticking.

In the physical quantity sensor according to the aspect of the invention, each of lengths of the first electrode and the second electrode in a direction along the center of oscillation axis may be longer than a length of the movable object.

In this way, at the time of manufacturing the physical quantity sensor, even if there is a deviation in the position relationships between the movable object and the first electrode and second electrode, it is possible to prevent the areas of the first region and the second region from changing, or reduce the amount of such changes.

In the physical quantity sensor according to the aspect of the invention, a relationship of L1≤L2 may be satisfied when a length between the first region and the center of oscillation axis in a plan view is set as L1 and a length between the second region and the center of oscillation axis in a plan view is set as L2.

In this way, it is possible to make the area of the first region be larger than the area of the second region while making the lengths of each of the first region and the second region in the direction along the center of oscillation axis be mutually the same.

In the physical quantity sensor according to the aspect of the invention, the movable object may include a through hole that is provided at a position superimposed on the edge portion of the second electrode in a plan view and passing through the thickness direction of the movable object.

In this way, it is possible to make the capacitance of the second fringe capacitance be small. Therefore, it is possible to easily offset at least a part of the difference between the first fringe capacitance and the second fringe capacitance.

In the physical quantity sensor according to the aspect of the invention, a length of the second movable portion in a direction orthogonal to the center of oscillation axis in a plan view may be longer than a length of the first movable portion.

In this way, it is possible to improve the detection accuracy by making the moment of the first movable portion and the second movable portion around the center of oscillation axis be different from each other. In addition, in such a case, the difference between the first fringe capacitance and the second fringe capacitance becomes large, and thus, the effects of applying the invention become prominent.

According to another aspect of the invention, there is provided a sensor device that includes the physical quantity sensor in the invention; and an electronic component that is electrically connected to the physical quantity sensor.

In this way, it is possible to provide a sensor device including the physical quantity sensor having excellent detection accuracy.

According to another aspect of the invention, there is provided an electronic apparatus that includes the physical quantity sensor in the invention.

In this way, it is possible to provide an electronic apparatus including the physical quantity sensor having excellent detection accuracy.

According to another aspect of the invention, there is provided a moving object that includes the physical quantity sensor in the invention.

In this way, it is possible to provide a moving object including the physical quantity sensor having excellent detection accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, a sensor device, an electronic apparatus, and a moving object will be described in detail based on embodiments illustrated in the drawings attached hereto.

1. Physical Quantity Sensor

First Embodiment

Figure 1:
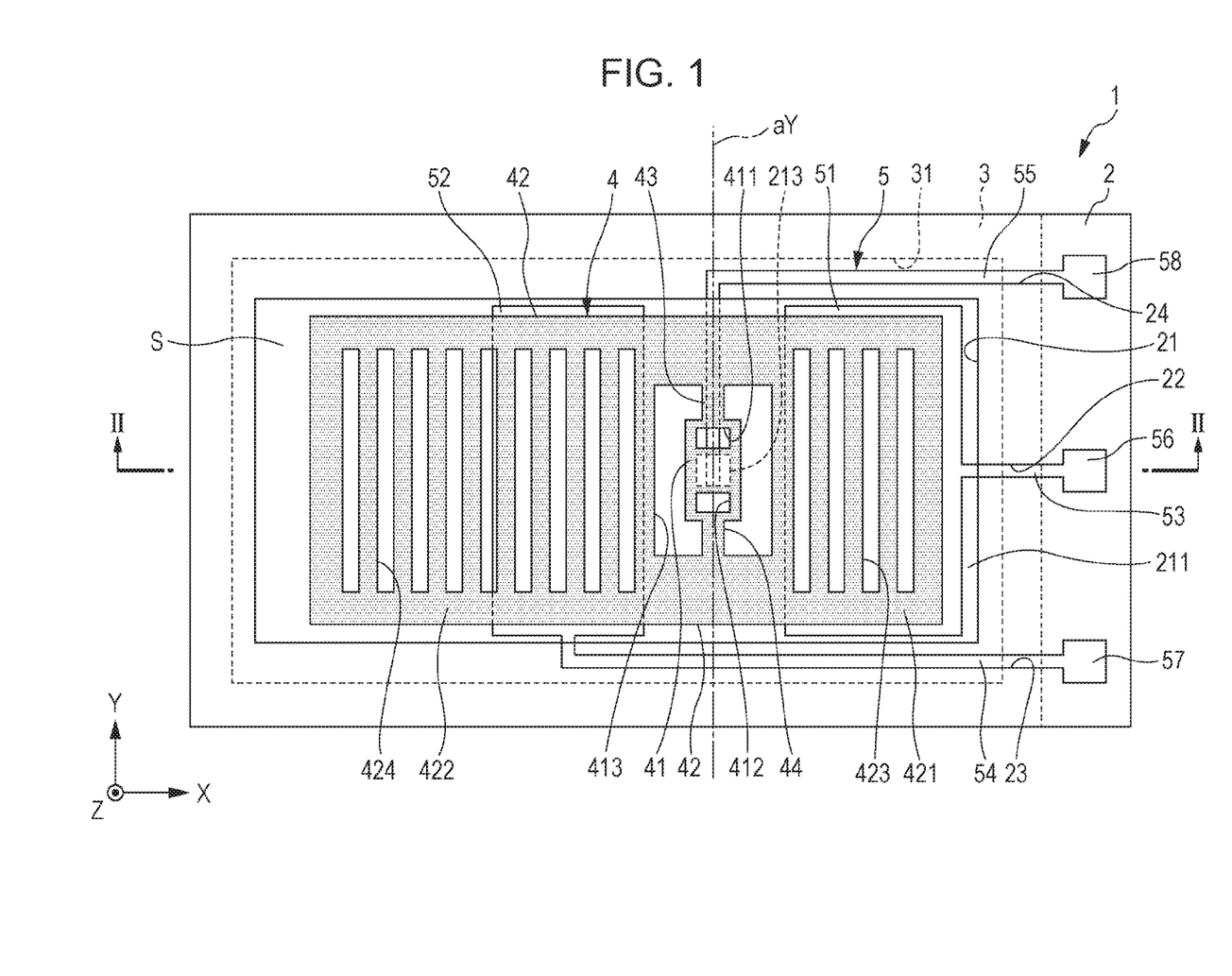
FIG. 1 is a plan view (top view) illustrating a physical quantity sensor according to a first embodiment of the invention.
Figure 2:
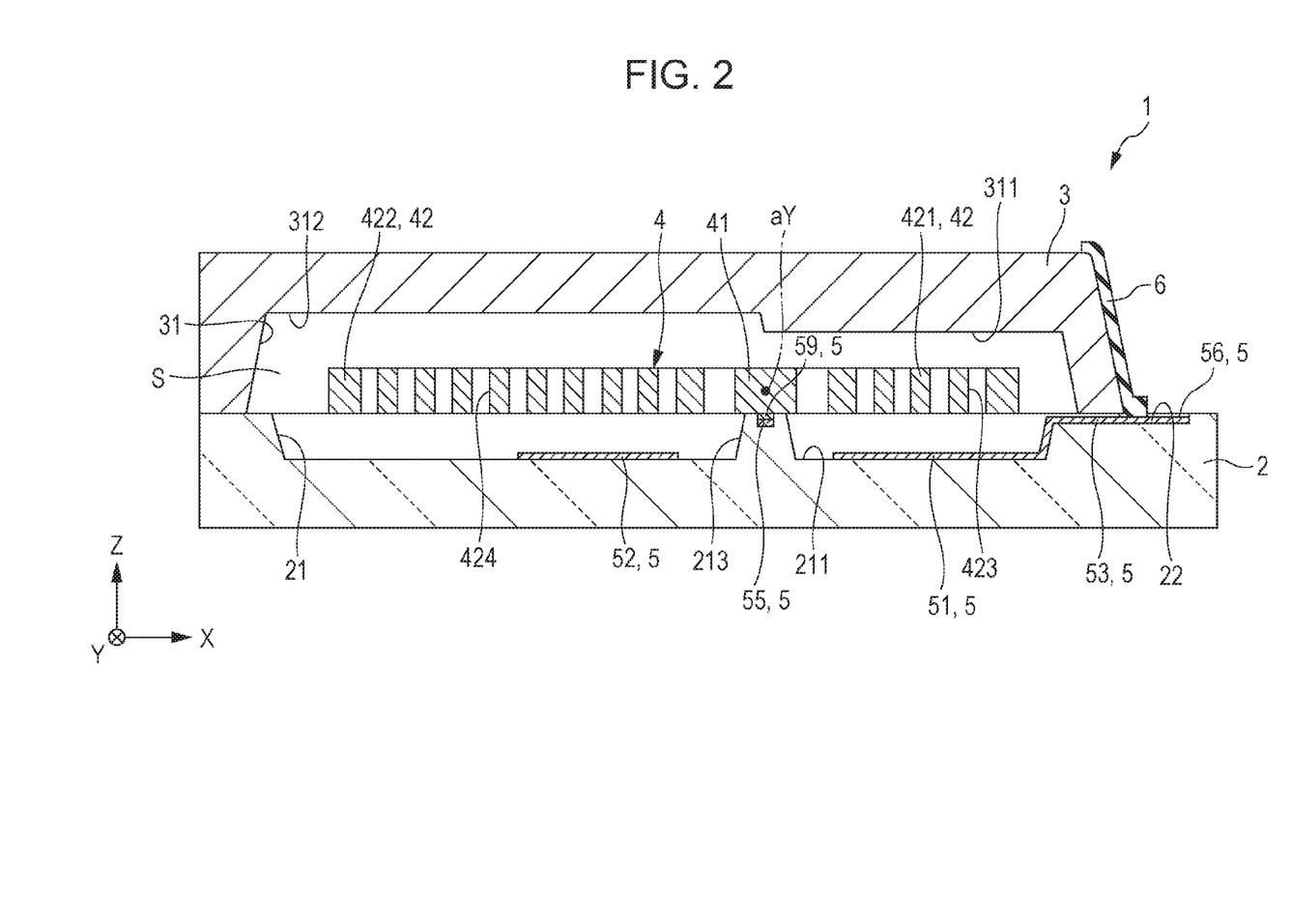
FIG. 2 is a cross-sectional view taken along the line II-II in FIG. 1.

FIG. 1 is a plan view (top view) illustrating a physical quantity sensor in a first embodiment of the invention. FIG. 2 is a cross-sectional view taken along the line II-II in FIG. 1. In each of the figures, for the convenience of the description, X axis, Y axis, and Z axis are illustrated as three mutually perpendicular axes. A distal end side of an arrow indicating each axis is assumed to be "+" and a base end side of the arrow is assumed to be "−". In addition, hereinafter, a direction parallel to the X axis is referred to as an "X axis direction", a direction parallel to the Y axis is referred to as a "Y axis direction", and a direction parallel to the Z axis is referred to as a "Z axis direction". In addition, the +Z axis direction side is referred to as "upper side" and the −Z axis direction side is referred to as "lower side".

A physical quantity sensor 1 illustrated in FIG. 1 and FIG. 2 is used as, for example, an inertial sensor, and specifically is used as an acceleration sensor for measuring acceleration in the Z axis direction. The physical quantity sensor 1 includes a base substrate 2 (a first substrate), a cover body 3 (a second substrate), an oscillating structure 4 (movable electrode) disposed in an internal space S form from the above-described substrates, and a conductor pattern 5 disposed on the base substrate 2. Hereinafter, each portion of the physical quantity sensor 1 will be sequentially described.

Base Substrate

The base substrate 2 has a plate shape, and a concave portion 21 is formed on the upper surface of the base substrate 2. The concave portion 21 functions as a clearance portion that prevents the movable portion 42 and the coupling portions 43 and 44 of the oscillating structure 4 described below from coming in contact with the base substrate 2. In addition, a protruding convex portion 213 is provided in a center portion of the concave portion 21 and a bottom surface 211. A below-described support portion 41 of the oscillating structure 4 is fixed to the convex portion 213. In addition, the side surface of the concave portion 21 and the side surface of the convex portion 213 are configured as inclined surfaces. In this way, routing of the wiring from the bottom surface 211 of the concave portion 21 to the upper surface of the base substrate 2 becomes easy, and a wiring formation failure or a disconnection is reduced. In addition, concave portions 23, 24, and 25 disposed around the concave portion 21 are formed on the base substrate 2. A part of the wirings 53, 54, and 55 of a conductor pattern 5 described below and terminals 56, 57, and 58 are disposed in the concave portions 23, 24, and 25.

It is preferable that the base substrate 2 described above has an insulating property, and for example, is formed of a glass material. Particularly, if the base substrate 2 is formed of a glass material containing alkali metal ion such as borosilicate glass, in a case where the cover body 3 or the oscillating structure 4 are formed of silicon, the bonding of the base substrate 2 and the cover body 3 or the oscillating structure 4 can be performed using an anodic bonding. The material for forming the base substrate 2 is not limited to the glass material, and for example, a high-resistance silicon material may be used. In addition, an insulating film such as a silicon oxide film or a silicon nitride film may be formed on the surface of the base substrate 2, if necessary.

Conductor Pattern

The conductor pattern 5 is provided on the upper surface of the base substrate 2. The conductor pattern 5 includes a first fixed electrode 51 (a first electrode) and a second fixed electrode 52 (a second electrode) that are disposed on the bottom surface 211 of the concave portion 21, as electrodes. In addition, the conductor pattern 5 includes a wiring 53 that is connected to the first fixed electrode 51 in the concave portion 21 and routed into the concave portion 22, a wiring 54 that is connected to the second fixed electrode 52 in the concave portion 21 and routed into the concave portion 23, and a wiring 55 that is connected to the oscillating structure 4 in the convex portion 213 and routed into the concave portion 24, as wirings. Here, the wiring 55 is connected to the oscillating structure 4 in a groove formed on the upper surface (top surface) of the convex portion 213 via a conductive bump 59. In addition, the conductor pattern 5 includes a terminal 56 that is disposed in the concave portion 22 and connected to the wiring 53, a terminal 57 that is disposed in the concave portion 23 and connected to the wiring 54, and a terminal 58 that is disposed in the concave portion 24 and connected to the wiring 55, as terminals. Here, the terminals 56, 57, and 58 are disposed ay the outside of the internal space S. In this way, the contact between the conductor pattern 5 and the outside (for example, an IC chip 102 which will be described below) is enabled.

A material for forming the conductor pattern 5 is not particularly limited as long as the material has conductive property. Examples of the material includes oxides (transparent electrode material) such as Indium Tin Oxide (ITO), Indium Zinc Oxide (IZO), In3O3, SnO2, SnO2 containing Sb, and ZnO containing Al, and Au, Pt, Ag, Cu, and Al and the alloy containing these material. One or a combination of two or more material items among the above can be used.

Oscillating Structure

As illustrated in FIG. 1 and FIG. 2, the oscillating structure 4 is provided on the upper side of the base substrate 2. The oscillating structure 4 includes a support portion 41, a plate-shaped movable portion 42 (a movable object) disposed so as to face the base substrate 2, a pair of coupling portions 43 and 44 that couple the movable portion 42 and the support portion 41 such that the movable portion 42 can oscillate with respect to the support portion 41. Then, the configured becomes such that the movable portion 42 can oscillate to seesaw with respect to the support portion 41 with an axis aY along the coupling portions 43 and 44 as a center of oscillation axis.

The movable portion 42 has a longitudinal shape (substantially rectangular shape) extending along the X axis direction. Here, the movable portion 42 is divided into a first movable portion 421 positioned at the +X axis direction (one direction) side and a second movable portion 422 positioned at the −X axis direction (the other direction) side with the axis aY which is the center of oscillation axis as a boundary in a plan view seen from a thickness direction of the base substrate 2 or the movable portion 42 (hereinafter, simply referred to as the "plan view").

Here, the first movable portion 421 is superimposed on the first fixed electrode 51 in a plan view, and the second movable portion 422 is superimposed on the second fixed electrode 52. That is, the first fixed electrode 51 is disposed on the base substrate 2 while facing the first movable portion 421, and forms an electrostatic capacitance Ca between the first fixed electrode 51 and the first movable portion 421. In addition, the second fixed electrode 52 is disposed on the base substrate 2 while facing the second movable portion 422, and forms an electrostatic capacitance Cb between the second fixed electrode 52 and the second movable portion 422.

In addition, a plurality of slits 423 extending along the Y axis direction is formed parallel to the X axis direction in the first movable portion 421. Similarly, a plurality of slits 424 is formed in the second movable portion 422. In this way, it is possible to reduce the gas damping between the movable portion 42, and the base substrate 2 and the cover body 3. In addition, an opening 425 is formed between the first movable portion 421 and the second movable portion 422 in the movable portion 42. The support portion 41 and the coupling portions 43 and 44 are disposed on the inner side of the opening 425.

In addition, in the first movable portion 421 and the second movable portion 422, rotation moments (inertial moment) around the axis aY when the acceleration in the Z axis direction is applied are different from each other. In this way, when receiving the acceleration in the Z axis direction, the movable portion 42 oscillates around the axis aY to seesaw, and a predetermined gradient is generated in the movable portion 42 according to the applied acceleration. In the present embodiment, the thickness in the Z axis direction and the width in the Y axis direction of the first movable portion 421 and those of the second movable portion 422 are equal to each other. However, a length of the second movable portion 422 in the X axis direction is longer than a length of the first movable portion 421 in the X axis direction. In this way, the rotation moment of the second movable portion 422 is larger than the rotation moment of the first movable portion 421. By designing in this way, it is possible to make the rotation moment of the first movable portion 421 and that of the second movable portion 422 be different from each other.

In addition, as described above, the widths of the first movable portion 421 and the second movable portion 422 in the Y axis direction are equal to each other. However, since the length of the second movable portion 422 in the X axis direction is longer than the length of the first movable portion 421 in the X axis direction, an area of the first movable portion 421 in a plan view is larger than an area of the second movable portion 422.

The shapes of the first movable portion 421 and the second movable portion 422 are not limited to the shapes described above as long as the rotation moment around the axis aY are different from each other. For example, as long as the thickness of the first movable portion 421 and that of the second movable portion 422 are different from each other, the shapes in the plan view may be the same (symmetrical shapes with respect to the axis aY). In addition, even in a case where the shapes of the first movable portion 421 and the second movable portion 422 are the same, it is possible to make the rotation moments of the first movable portion 421 and the second movable portion 422 in the axis aY be different from each other by disposing a weight portion on any of the first movable portion 421 or the second movable portion 422. As the weight portion, a weight material such as tungsten or molybdenum may be disposed as separated body or may be integrally formed with the movable portion 42.

In addition, the center portion of the support portion 41 in the Y axis direction disposed in the opening portion 413 as described above is bonded to the convex portion 213 of the base substrate 2. In addition, the support portion 41 and the movable portion 42 are linked to each other by the coupling portions 43 and 44 disposed together with the support portion 41 in the opening portion 413. In addition, the coupling portions 43 and 44 are coaxially disposed on both sides to the support portion 41. Then, when the movable portion 42 oscillates to seesaw around the axis aY, the coupling portions 43 and 44 function as a torsion spring.

In addition, portions at both end sides of the support portion 41 in the Y axis direction are separated with respect to the base substrate 2, and through holes 411 and 412 are formed on the portions described above. These through holes 411 and 412 are disposed on the axis aY. In this way, it is possible to reduce the effects of stresses caused by, for example, difference in linear expansion coefficient of the base substrate 2 and the oscillating structure 4 on the coupling portions 43 and 44. The shape of the support portion 41 is not limited to the shape described above, and for example, the through holes 411 and 412 may be omitted.

The oscillating structure 4 described above is formed on silicon on which, for example, impurity such as phosphorus or boron are doped. In this way, it is possible to realize the oscillating structure 4 having excellent dimensional accuracy by performing etching processing on the silicon substrate. In addition, in a case where the base substrate 2 formed from a glass material, it is possible to perform the boding of the oscillating structure 4 and the base substrate 2 using the anodic bonding. The material for forming the oscillating structure 4 is not limited to the silicon. In addition, the base material for the oscillating structure 4 may not have the conductivity, and in this case, for example, a conductive metal layer may be formed on the surface of the of the movable portion 42.

Cover Body

The cover body 3 is disposed on the opposite side of the base substrate 2 with respect to the movable portion 42 of the oscillating structure 4 described above. Then, the cover body 3 is boded to the base substrate 2. The cover body 3 has a plate shape, and a concave portion 31 is formed on the bottom surface (a surface of the base substrate 2 side) of the cover body 3. The concave portion 31 forms the internal space S together with the concave portion 21 of the base substrate 2 described above. In addition, a bottom surface of the concave portion 31 has two portions 311 and 312 of which the depths are different from each other, which will be described below. The shape of the concave portion 31 is not particularly limited as long as, for example, the depth of the concave portion 31 is constant.

The cover body 3 described above is formed of, for example, silicon. In this way, in a case where the base substrate 2 is formed of the glass material, it is possible to perform the bonding of the cover body 3 and the base substrate 2 using the anodic bonding. As described above, since the concave portions 22, 23, and 24 that cross the inside and the outside of the internal space S are formed on the upper surface of the base substrate 2, in a state in which the cover body 3 is only bonded to the base substrate 2, the inside and the outside of the internal space S are communicated via the concave portions 22, 23, and 24. Therefore, in the present embodiment, the internal space S is hermetically sealed by covering the concave portions 22, 23, and 24 using a sealing portion 6 such as a SiO2 film formed by a TEOSCVD method as illustrated in FIG. 2.

As described above, the configuration of the physical quantity sensor 1 is simply described. The physical quantity sensor 1 configured as described above detects the acceleration in the Z axis direction as described below.

When the acceleration in the Z axis direction is applied to the physical quantity sensor 1, the movable portion 42 oscillates to seesaw with the axis aY as the center of oscillation axis due to the fact that the rotation moments around the axis aY of the first movable portion 421 and the second movable portion 422 are different from each other. At this time, since the rotation moment of the second movable portion 422 is larger than the rotation moment of the first movable portion 421, in a case where the direction of the acceleration applied to the physical quantity sensor 1 is the −Z axis direction, the movable portion 42 oscillates to seesaw around the axis aY such that the first movable portion 421 moves away from the first fixed electrode 51 and the second movable portion 422 approaches the second fixed electrode 52. On the other hand, in a case where the direction of the acceleration applied to the physical quantity sensor 1 is the +Z axis direction, the movable portion 42 oscillates to seesaw around the axis aY such that the first movable portion 421 approaches the first fixed electrode 51 and the second movable portion 422 moves away from the second fixed electrode 52.

As described above, the separated distance between the first movable portion 421 and the first fixed electrode 51 and the separated distance between the second movable portion 422 and the second fixed electrode 52 respectively change according to the direction and the amount of the acceleration applied to the physical quantity sensor 1, and accordingly, the electrostatic capacitances Ca and Cb change. Therefore, it is possible to detect the value of the acceleration based on the amount of changes of the electrostatic capacitances Ca and Cb (for example, a differential signal of the electrostatic capacitances Ca and Cb).

Adjustment of the Electrostatic Capacitance Offset

Figure 3:
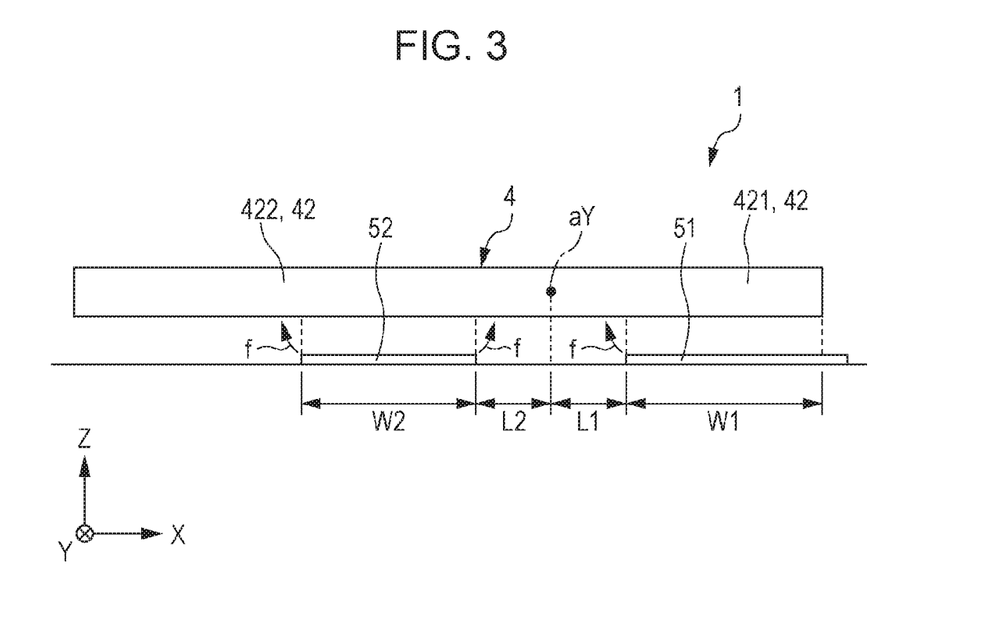
FIG. 3 is a schematic diagram for describing a fringe capacitance in the physical quantity sensor illustrated in FIG. 1.
Figure 4:
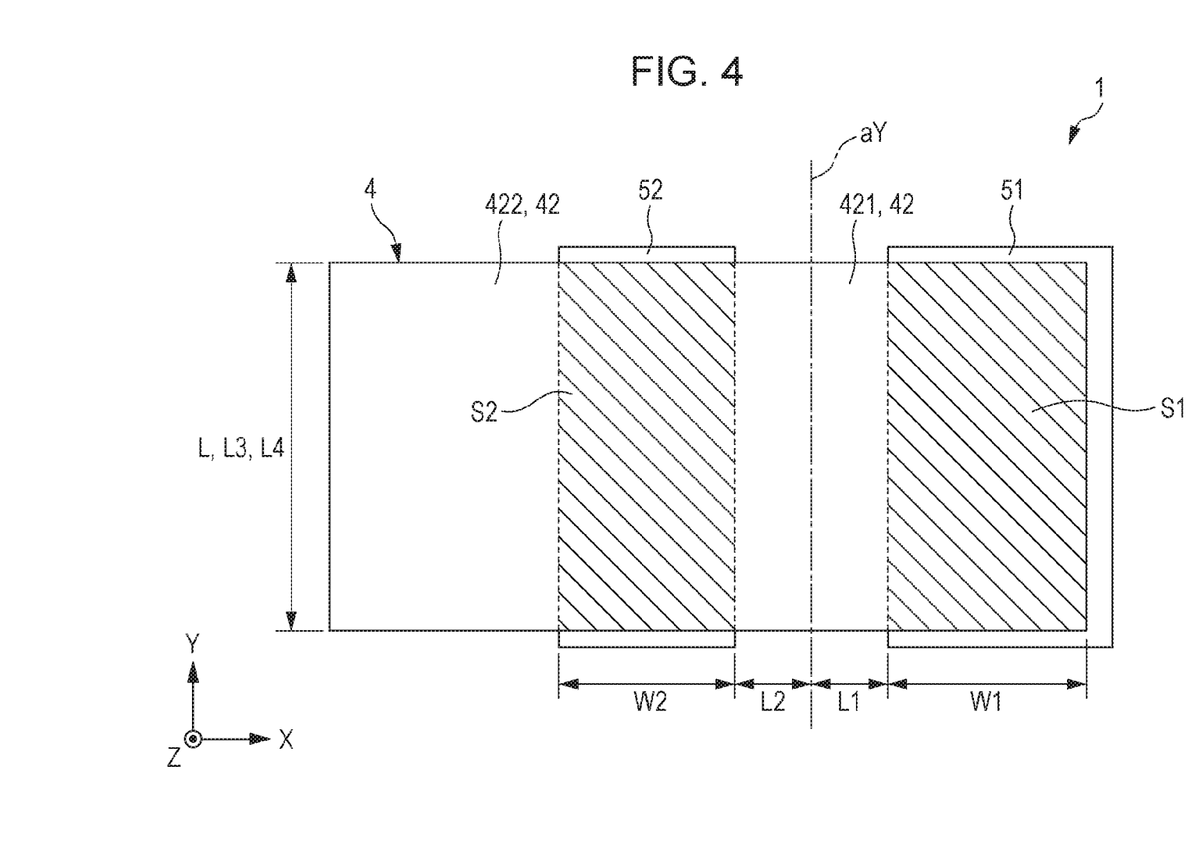
FIG. 4 is a schematic diagram for describing a first region and a second region in the physical quantity sensor illustrated in FIG. 1.

FIG. 3 is a schematic diagram for describing the fringe capacitance in the physical quantity sensor illustrated FIG. 1. FIG. 4 is a schematic diagram for describing a first region and a second region in the physical quantity sensor illustrated FIG. 1.

In the physical quantity sensor described above, as illustrated in FIG. 3, a fringe capacitance f is generated between the movable portion 42 and both ends of the first fixed electrode 51 and the second fixed electrode 52 in the axis aY side. On the other hand, with regard to the ends of the first fixed electrode 51 and the second fixed electrode 52 in the opposite side of the axis aY, the fringe capacitance f is hardly generated between the first fixed electrode 51 the movable portion 42 while the fringe capacitance f is generated between the second fixed electrode 52 and the movable portion 42.

Therefore, the fringe capacitance generated between the first movable portion 421 and the first fixed electrode 51 (hereinafter, simply referred to as "a first fringe capacitance") is smaller than the fringe capacitance between the second movable portion 422 and the second fixed electrode 52 (hereinafter, simply referred to as "a second fringe capacitance"). This is because the length of the second movable portion 422 in the direction orthogonal to the axis aY in a plan view is longer than the length of the first movable portion 421. In this case, a difference between the first fringe capacitance and the second fringe capacitance becomes large.

In the related art, due to the difference in two fringe capacitances described above, an electrostatic capacitance offset (hereinafter, simply referred to as "electrostatic capacitance offset") which is the difference between the electrostatic capacitance between the first movable portion 421 and the first fixed electrode 51 and the electrostatic capacitance between the second movable portion 422 and the second fixed electrode 52 in a state in which the physical quantity is not applied to the movable portion 42 becomes large, and as a result thereof, there has been a problem in that the detection accuracy deteriorates.

Therefore, in the physical quantity sensor 1, the first fixed electrode 51 and the second fixed electrode 52 are configured so as to offset at least a part of the difference between the first fringe capacitance and the second fringe capacitance. Specifically, in the present embodiment, an area of a first region S1 in which the first movable portion 421 and the first fixed electrode 51 are superimposed on each other in a plan view is larger than an area of a second region S2 in which the second movable portion 422 and the second fixed electrode 52 are superimposed on each other (refer to FIG. 4). That is, the areas of the first region S1 and the second region S2 are adjusted such that the electrostatic capacitance offset becomes small (preferably, becomes zero).

At least a part of the difference of the first fringe capacitance and the second fringe capacitance is offset by configuring the first fixed electrode 51 and the second fixed electrode 52 as described above, and thus, the electrostatic capacitance offset can be reduced. As a result thereof, it is possible to improve the detection accuracy.

The areas of the first region S1 and the second region S2 means the areas of the portions excluding the areas of the slits 423 and 424 described above. In the present embodiment, an arrangement density (an occupied area) of the slit 423 in the first movable portion 421 and an arrangement density (an occupied area) of the slit 424 in the second movable portion 422 are mutually the same.

Here, in the present embodiment, a length W2 (a second width) of the second region S2 in the X axis direction which is the direction where the first movable portion 421 and the second movable portion 422 are arranged is shorter than a length W1 (a first width) of the first region S1. In this way, even when the lengths of the first movable portion 421 and the second movable portion 422 in the direction along the axis aY (that is, Y axis direction) are mutually the same, it is possible to offset at least a part of the difference between the first fringe capacitance and the second fringe capacitance by making the area of the first region S1 be larger than the area of the second region S2.

In addition, the end of the first fixed electrode 51 in the opposite side of the axis aY (that is, +X axis direction side) in a plan view is positioned at the outer side of the first region S1. In this way, it is possible to prevent the first movable portion 421 from sticking to the base substrate 2, or reduce a degree of such sticking. In addition, as described above, the fringe capacitance f is hardly generated between the end of the first fixed electrode 51 in the opposite side of the axis aY described above and the movable portion 42. Therefore, it is needed to adjust the areas of the first region S1 and the second region S2 as described above.

In addition, the lengths L3 and L4 of each of the first fixed electrode 51 and the second fixed electrode 52 in the Y axis direction which is the direction along the axis aY are longer than the length L of the movable portion 42. In this way, at the time manufacturing the physical quantity sensor 1, even if there is a deviation in the position relationships between the movable portion 42 and the first fixed electrode 51 and second fixed electrode 52, it is possible to prevent the areas of the first region S1 and the second region S2 from changing, or reduce the amount of such changes.

In addition, when the length between the first region S1 and the axis aY in a plan view is set as a length L1, and a length between the second region S2 and the axis aY, in a plan view is set as a length L2, it is preferable that the relationship L1≤L2 is satisfied. In this way, it is possible to make the area of the first region S1 be larger than the area of the second region S2 while making the lengths L3 and L4 of each of the first region S1 and the second region S2 in the direction along the axis aY be mutually the same.

In addition, the slit 424 is provided on the position superimposed an edge portion (specifically, the end in the −X direction side) of the second fixed electrode 52 in a plan view. In this way, it is possible to make the capacitance of the second fringe capacitance be small. Therefore, it is possible to easily offset at least a part of the difference between the first fringe capacitance and the second fringe capacitance.

Second Embodiment

Next, a second embodiment of the invention will be described.

Figure 5:
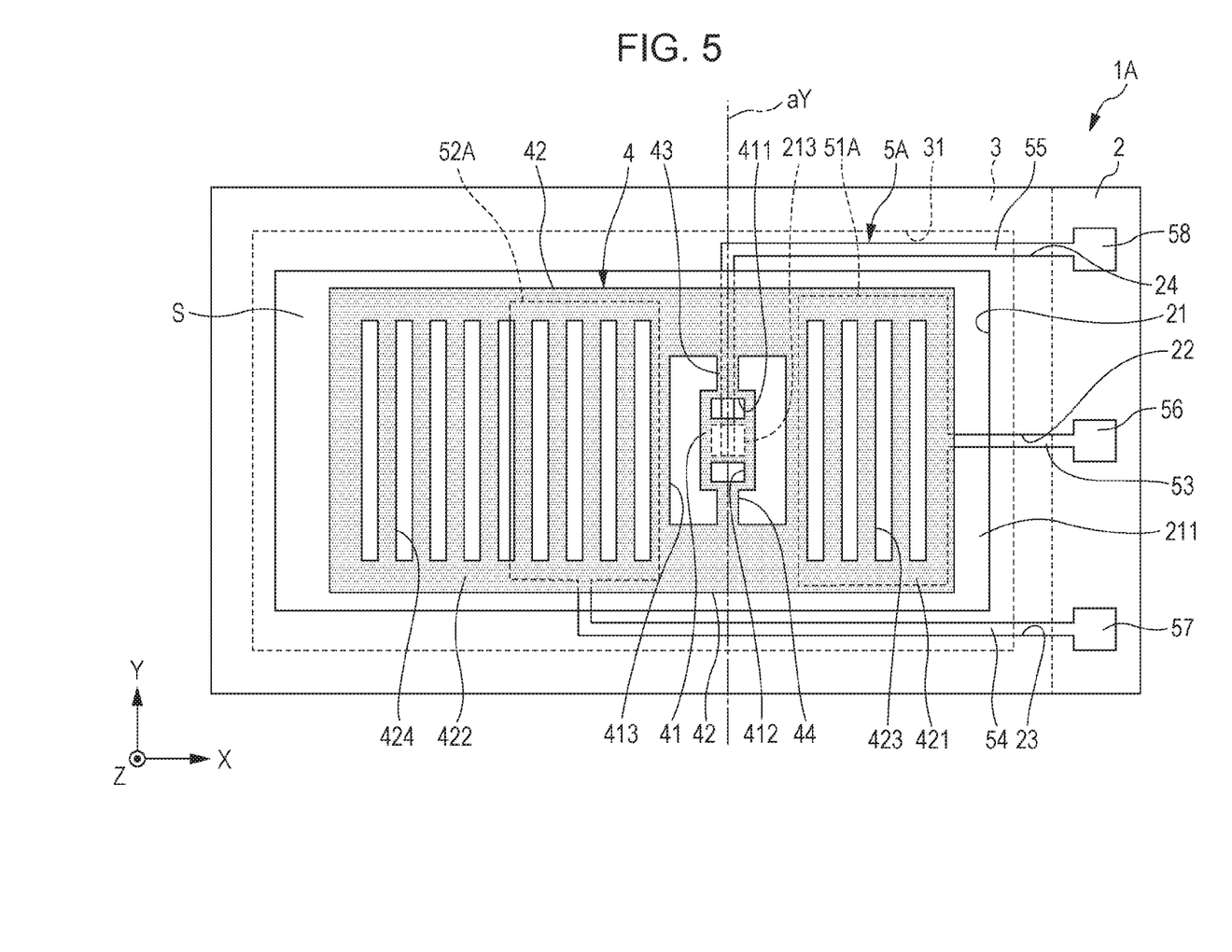
FIG. 5 is a plan view (top view) illustrating a physical quantity sensor according to a second embodiment of the invention.
Figure 6:
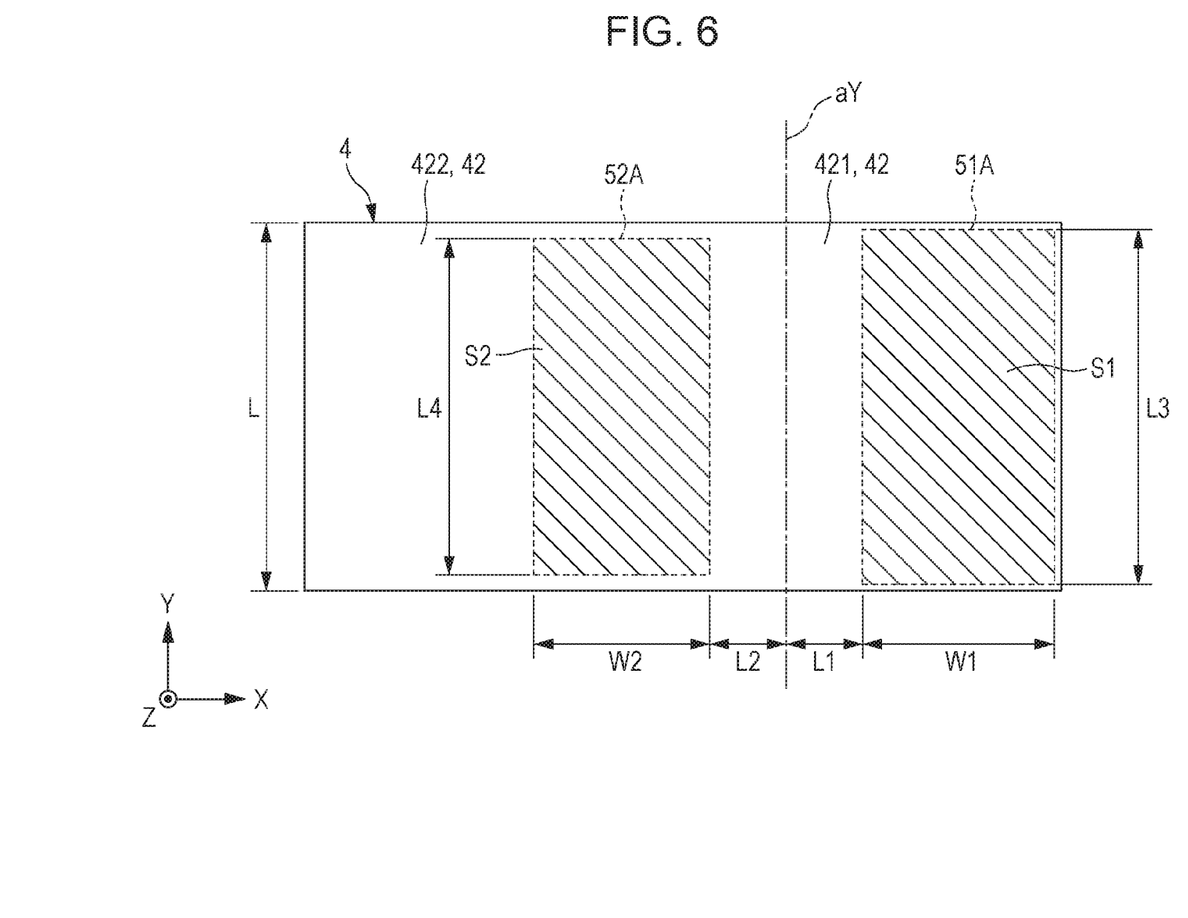
FIG. 6 is a schematic diagram for describing a first region and a second region in the physical quantity sensor illustrated in FIG. 5.

FIG. 5 is a plan view (top view) illustrating a physical quantity sensor in the second embodiment of the invention. FIG. 6 is a schematic diagram for describing a first region and a second region in the physical quantity sensor illustrated FIG. 5.

The present embodiment is similar to the first embodiment except that the shapes of the first electrode and the second electrode in a plan view in the present embodiment are different from each other.

The description hereafter relates to the second embodiment and the description will be focused on the points different from that in the embodiment described above, and the descriptions for points similar to that in the embodiment described above will be omitted.

A physical quantity sensor 1A illustrated in FIG. 5 includes a first fixed electrode 51A (a first electrode) and a second fixed electrode 52A (a second electrode) which are disposed on an inner side of an outer peripheral edge of the movable portion 42 in a plan view.

In the physical quantity sensor 1A also, the first fixed electrode 51A and the second fixed electrode 52A are configured so as to offset at least a part of the difference between the first fringe capacitance and the second fringe capacitance. Specifically, in the present embodiment, the area of the first region S1 in which the first movable portion 421 and the first fixed electrode 51A are superimposed on each other in a plan view is larger than the area of the second region S2 in which the second movable portion 422 and the second fixed electrode 52A are superimposed on other in a plan view (refer to FIG. 6).

Particularly, in the present embodiment, a length L4 of the second region S2 in the Y axis direction which is the direction along the axis aY is shorter than a length L3 of the first region S1. In this way, even if the lengths of the first movable portion 421 and the second movable portion 422 along the X axis direction are equal to each other, the area of the first region S1 becomes larger than the area of the second region S2, and thus, it is possible to offset at least a part of the difference between the first fringe capacitance and the second fringe capacitance.

Even in the physical quantity sensor 1A described above, it is possible to improve the detection accuracy.

2. Sensor Device

Next, a sensor device in the invention will be described.

Figure 7:
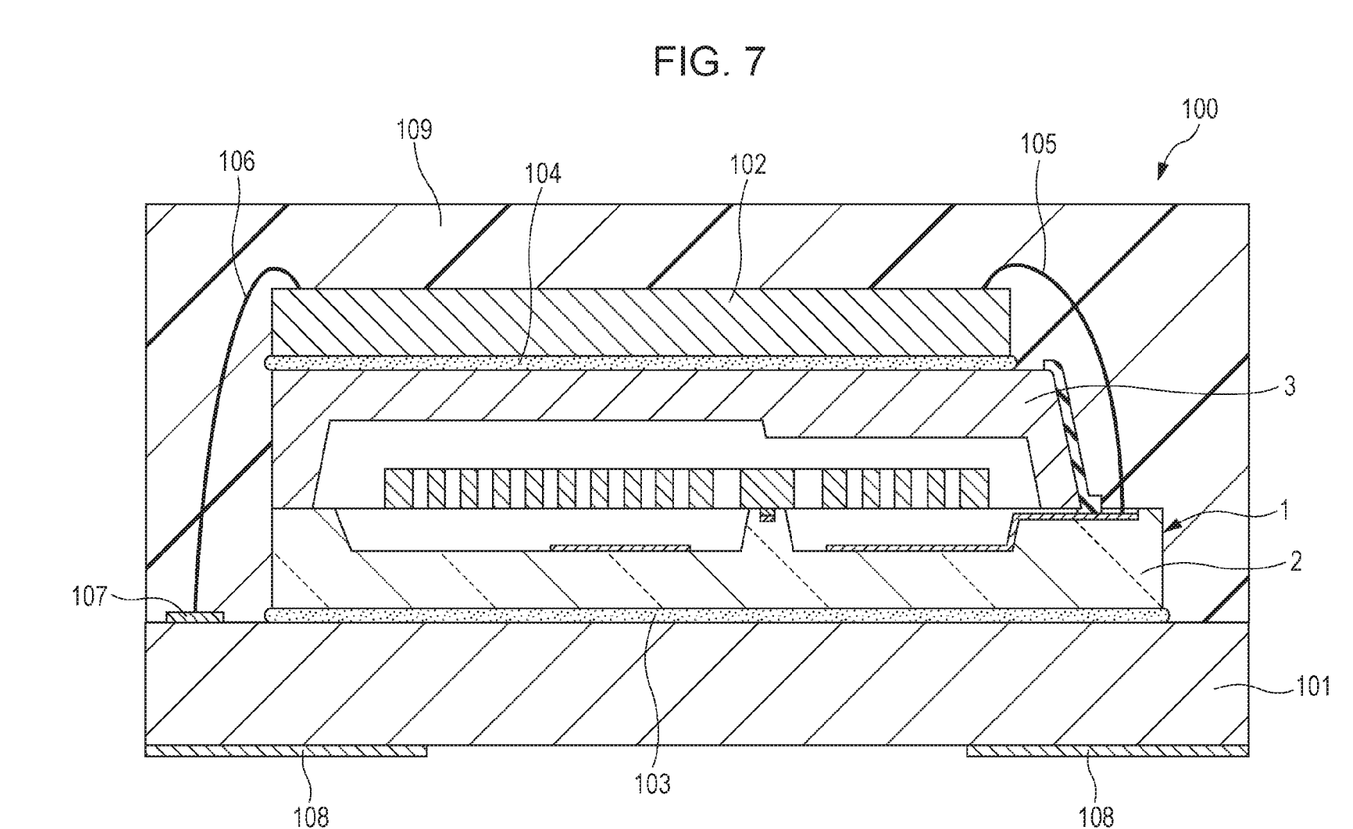
FIG. 7 is a cross-sectional view illustrating an example of a sensor device in the invention.

FIG. 7 is a cross-sectional view illustrating an example of the sensor device in the invention.

A sensor device 100 illustrated in FIG. 7 includes a substrate 101, a physical quantity sensor 1 that is fixed on an upper surface of the substrate 101 via an adhesive layer 103, an IC chip (an electronic component) 102 that is fixed on the upper surface of the physical quantity sensor 1 via an adhesive layer 104. Then, the physical quantity sensor 1 and the IC chip 102 are molded by a molding material 109 while exposing the lower surface of the substrate 101. For example, soldering, a silver paste, a resin-based adhesive (die attaching agent) or the like can be used as the adhesive layers 103 and 104. In addition, for example, thermosetting epoxy resin can be used as the molding material 109, and the molding can be performed using, for example, a transfer molding method.

In addition, a plurality of terminals 107 is disposed on the upper surface of the substrate 101, and a plurality of mounting terminals 108 which are connected to the terminals 107 via a not illustrated internal wiring or a castellation, is disposed on the lower surface. For example, a silicon substrate, a ceramic substrate, a resin substrate, a glass substrate, a glass epoxy substrate, or the like can be used as the substrate 101, but it is not particularly limited thereto.

In addition, for example, a drive circuit that drives the physical quantity sensor 1, a correction circuit that corrects differential signals of the electrostatic capacitances Ca and Cb, a detection circuit that detects an acceleration from the differential signals of the electrostatic capacitances Ca and Cb, an output circuit that converts the signals from the detection circuit into predetermined signals and outputs the results, or the like are included in the IC chip 102. The IC chip 102 described above is electrically connected to terminals 56, 57, and 58 of the physical quantity sensor 1 via a bonding wire 105, and is electrically connected to a terminal 107 of the substrate 101 via a bonding wire 106.

The sensor device 100 described above includes the physical quantity sensor 1, and has an excellent reliability.

3. Electronic Apparatus

An electronic apparatus in the invention will be described.

Figure 8:
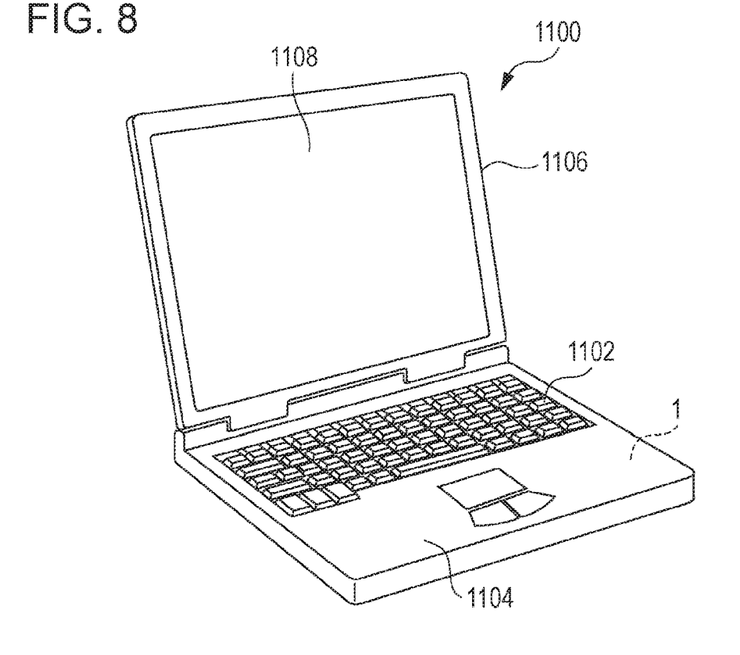
FIG. 8 is a perspective view illustrating a configuration of a mobile type (or a notebook type) personal computer to which an electronic apparatus according to the invention is applied.

FIG. 8 is a perspective view illustrating a configuration of a mobile type (or a notebook type) personal computer to which the electronic apparatus in the invention is applied.

In this Figure, a personal computer 1100 is configured to include a main body portion 1104 that includes a keyboard 1102 and a display unit 1106 that includes a display 1108, and the display unit 1106 is rotatably supported to the main body portion 1104 via a hinge mechanism portion.

The physical quantity sensor 1 is mounted on the personal computer 1100 described above, which measures a physical quantity such as an acceleration or the angular velocity for measuring falling or tilting of the computer. As described above, by mounting such the physical quantity sensor 1, it is possible to get the personal computer 1100 having a high reliability.

Figure 9:
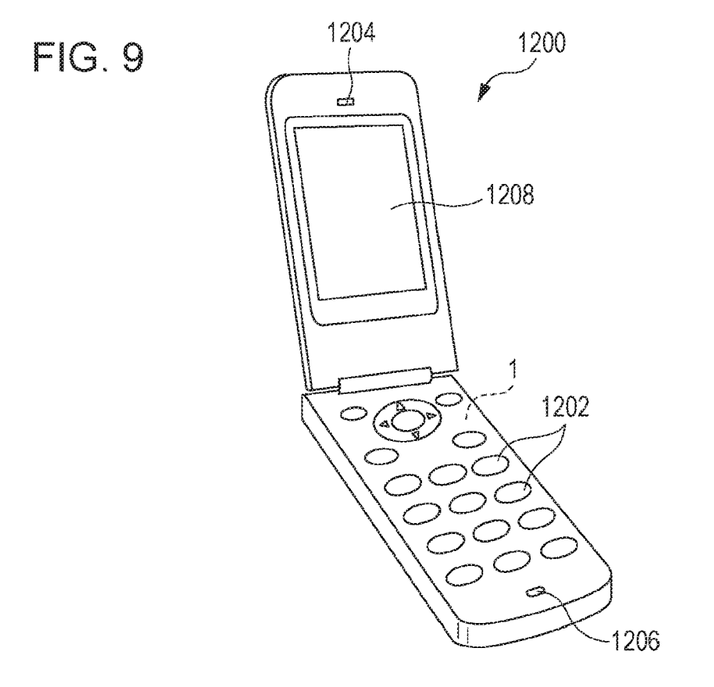
FIG. 9 is a perspective view illustrating a configuration of a mobile phone (including a PHS) to which the electronic apparatus according to the invention is applied.

FIG. 9 is a perspective view illustrating a configuration of a mobile phone (including a PHS) to which the electronic apparatus in the invention is applied.

In the Figure, a mobile phone 1200 includes an antenna (not illustrated), a plurality of operation buttons 1202, an ear piece 1204 and a mouth piece 1206. The display 1208 is disposed between the operation button 1202 and the ear piece 1204. The physical quantity sensor 1 is mounted on the mobile phone 1200 described above, which measures a physical quantity such as an acceleration or the angular velocity for measuring falling or tilting of the mobile phone. As described above, by mounting such the physical quantity sensor 1, it is possible to get the mobile phone 1200 having a high reliability.

Figure 10:
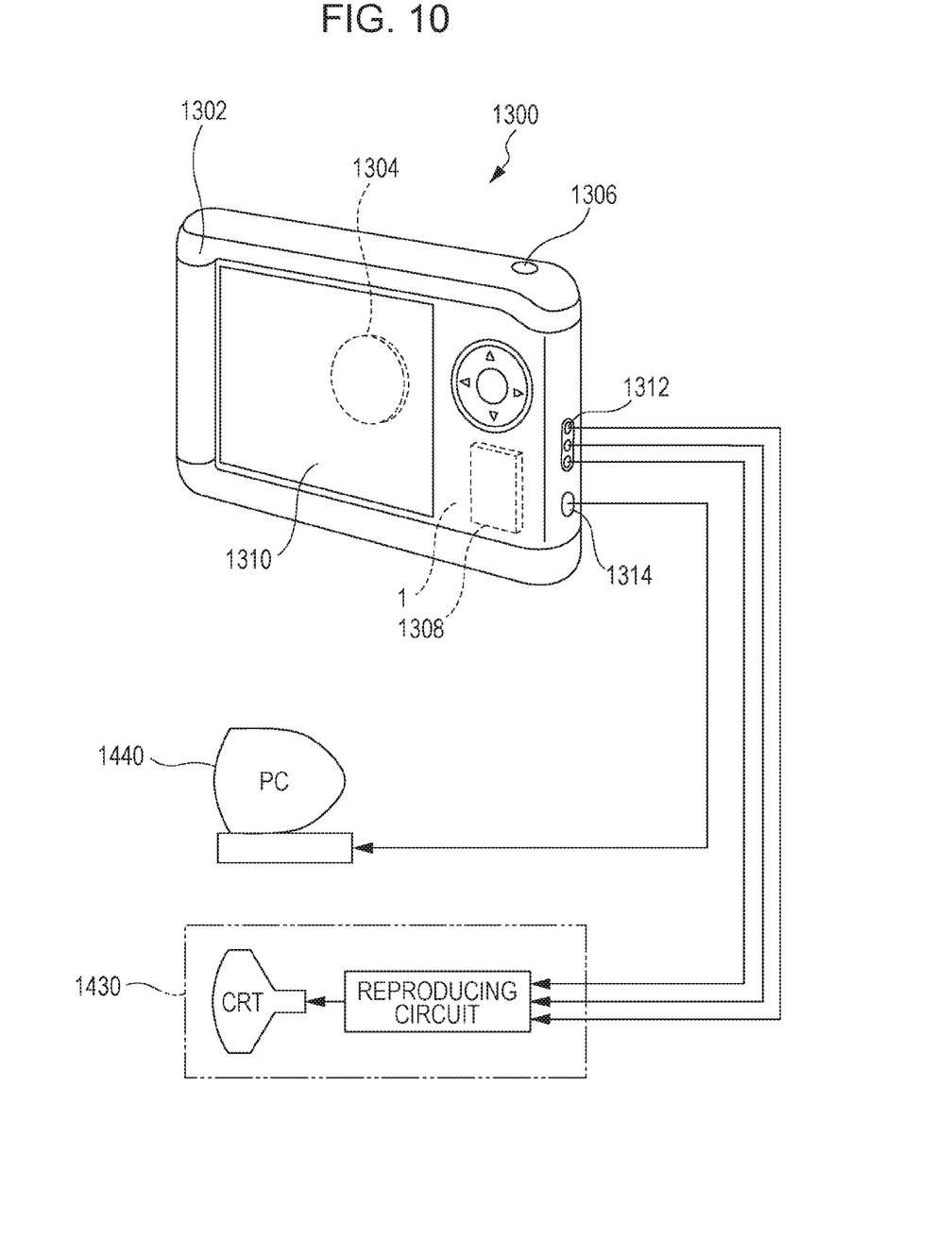
FIG. 10 is a perspective view illustrating a configuration of a digital still camera to which the electronic apparatus according to the invention is applied.

FIG. 10 is a perspective view illustrating a configuration of a digital still camera to which the electronic apparatus in the invention is applied. Connections to external devices are also simply illustrated in this Figure.

Here, in a digital still camera 1300, a captured image signal (image signal) is generated by a photoelectric conversion of a light image of an object using an imaging element such as a charge coupled device (CCD) while a silver halide film is exposed to the light image of an object in a usual camera.

A display 1310 is provided on a rear surface of a case (body) 1302 of the digital still camera 1300, and performs the displaying based on the image captured by the CCD. The display 1310 functions as a finder that displays the object as an electronic image. In addition, a light receiving unit 1304 including an optical lens (an imaging optical system) and the CCD is provided on the front side (rear side in the Figure) of the case 1302.

When a photographer checks an object image displayed on the display and presses a shutter button 1306, the captured image on the CCD at that time is transferred to and stored in a memory 1308. In addition, in the digital still camera 1300, a video signal output terminal 1312 and an input/output terminal 1314 for data communication are provided on the side surface of the case 1302. Then, as illustrated in the Figure, a television monitor 1430 is connected to the video signal output terminal 1312 and a personal computer 1440 is connected to the input/output terminal 1314 for data communication according to the necessity respectively. Furthermore, in the configuration, the captured image signal stored in the memory 1308 is output to a television monitor 1430 or to a personal computer 1440. The physical quantity sensor 1 is mounted on the digital still camera 1300 described above, which measures a physical quantity such as an acceleration or the angular velocity for measuring falling or tilting of the mobile phone. As described above, by mounting such the physical quantity sensor 1, it is possible to get the digital still camera 1300 having a high reliability.

Other than to the personal computer (mobile type personal computer) in FIG. 8, the mobile phone in FIG. 9, and the digital still camera in FIG. 10, the electronic apparatus in the invention can be applied to, for example, a smart phone, a tablet terminal, a watch, an inkjet ejection device (for example, an inkjet printer), a laptop personal computer, a television set, a video camera, a video tape recorder, a car navigation device, a pager, an electronic diary (including that having communication functions), an electronic dictionary, a calculator, an electronic game machine, a word processor, a workstation, a videophone, a security television monitor, an electronic binocular, a POS terminal, a medical apparatus (for example, an electronic thermometer, a sphygmomanometer, a blood glucose meter, an electrocardiogram measuring device, an ultrasonic diagnostic apparatus, and an electronic endoscope), a fish finder, various measurement devices, various instruments (for example, instruments for vehicles, aircrafts, and ships), a flight simulator, and the like.

4. Moving Object

Next, a moving object in the invention will be described.

Figure 11:
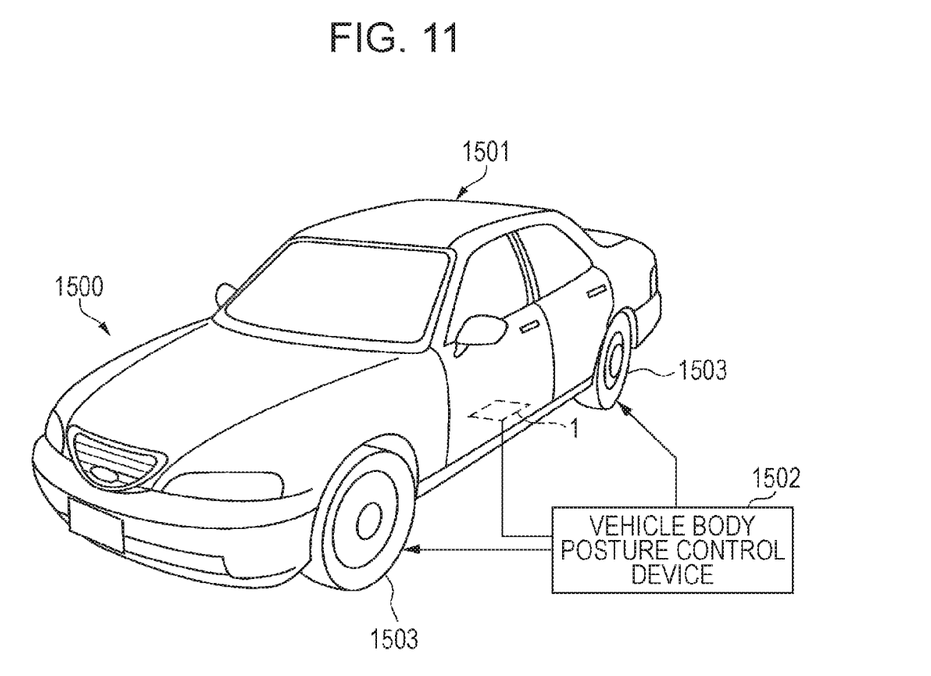
FIG. 11 is a perspective view illustrating a configuration of a vehicle to which a moving object according to the invention is applied.

FIG. 11 is a perspective view illustrating a configuration of a vehicle to which a moving object in the invention is applied.

The physical quantity sensor 1 is embedded in a vehicle 1500 and a posture of a vehicle body 1501 can be detected using the physical quantity sensor 1. A detection signal from the physical quantity sensor 1 is supplied to a vehicle body posture control device 1502. The vehicle body posture control device 1502 detects the posture of the vehicle body 1501 based on the signal, and can control a hardness of a suspension according to the detection result or can control the braking of each vehicle wheel 1503.

As described above, the physical quantity sensor, the sensor device, the electronic apparatus and the moving object in the invention is described based on the illustrated embodiments. However, the invention is not limited thereto, and the configuration of each portion or unit may be replaced by any other portions or units having similar functions. In addition, other arbitrary configuration elements may be added to the invention.

In the embodiments described above, a case of the configuration is described, in which at least a part of the difference between the first fringe capacitance and the second fringe capacitance is offset by adjusting the areas of the first region and the second region. However, the invention is not limited thereto, and can be configured such that at least a part of the difference between the first fringe capacitance and the second fringe capacitance is offset by, for example, varying the thicknesses of the first electrode and the second electrode or by varying the constituent materials.

The entire disclosure of Japanese Patent Application No. 2015-181651, filed Sep. 15, 2015 is expressly incorporated by reference herein.

What is claimed is:

1. A physical quantity sensor comprising:

a substrate;

a movable object that is oscillatably provided around a center of oscillation axis while facing the substrate and that is divided into a first movable portion and a second movable portion of which an area is larger than that of the first movable portion with the center of oscillation axis as a boundary in a plan view seen from a thickness direction of the substrate;

a first electrode that is disposed on the substrate facing the first movable portion and spaced apart from the center of oscillation axis; and a second electrode that is disposed on the substrate facing the second movable portion and spaced apart from the center of oscillation axis, wherein the first electrode and the second electrode are each configured to move the movable object, and each configured to generate a capacitance, a distance at which the first electrode is spaced apart from the center of oscillation axis is equal to a distance at which the second electrode is spaced apart from the center of oscillation axis, a width of the second electrode in a direction that is co-planar with the substrate and orthogonal to the oscillation axis is less than a width of the first electrode in said direction, and the first electrode and the second electrode are configured so as to offset at least a part of a difference between a first fringe capacitance, which is between the first movable portion and the first electrode, and a second fringe capacitance, which is between the second movable portion and the second electrode.

2. The physical quantity sensor according to claim 1, wherein the movable object includes a through hole that is provided at a position superimposed on an edge portion of the second electrode in a plan view and passing through the thickness direction of the movable object.

3. A sensor device comprising:

the physical quantity sensor according to claim 1; and an electronic component that is electrically connected to the physical quantity sensor.

4. An electronic apparatus comprising:

the physical quantity sensor according to claim 1.

5. A moving object comprising:

the physical quantity sensor according to claim 1.

6. The physical quantity sensor according to claim 1, wherein an entirety of each of the first electrode and the second electrode are overlapped by the movable object in a plan view.

7. A physical quantity sensor comprising:

a substrate;

a movable object that is oscillatably provided around a center of oscillation axis while facing the substrate and that is divided into a first movable portion and a second movable portion of which an area is larger than that of the first movable portion with the center of oscillation axis as a boundary in a plan view seen from a thickness direction of the substrate;

a first electrode that is disposed on the substrate facing the first movable portion and spaced apart from the center of oscillation axis; and a second electrode that is disposed on the substrate facing the second movable portion and spaced apart from the center of oscillation axis, wherein the first electrode and the second electrode are each configured to move the movable object, and each configured to generate a capacitance, a distance at which the first electrode is spaced apart from the center of oscillation axis is equal to a distance at which the second electrode is spaced apart from the center of oscillation axis, a width of the second electrode in a direction that is co-planar with the substrate and orthogonal to the oscillation axis is less than a width of the first electrode in said direction such that an area of a first region in which the first movable portion and the first electrode are superimposed on each other is larger than an area of a second region in which the second movable portion and the second electrode are superimposed on each other in a plan view.

8. The physical quantity sensor according to claim 7,
wherein an end of the first electrode at the opposite side of the center of oscillation axis in a plan view is positioned at an outer side of the first region.

9. The physical quantity sensor according to claim 7,
wherein an end of the first electrode at the opposite side of the center of oscillation axis in a plan view is positioned at an outer side of the first region.

10. The physical quantity sensor according to claim 7,
wherein the movable object includes a through hole that is provided at a position superimposed on an edge portion of the second electrode in a plan view and passing through the thickness direction of the movable object.

11. The physical quantity sensor according to claim 7,
wherein a length of the second movable portion in a direction orthogonal to the center of oscillation axis in a plan view is longer than a length of the first movable portion.

12. A sensor device comprising:
the physical quantity sensor according to claim 7; and
an electronic component that is electrically connected to the physical quantity sensor.

13. An electronic apparatus comprising:
the physical quantity sensor according to claim 7.

14. A moving object comprising:
the physical quantity sensor according to claim 7.

\* \* \* \* \*